No. 833,268. PATENTED OCT. 16, 1906.
A. McL. WALTER.
MANURE AND FERTILIZER DISTRIBUTER.
APPLICATION FILED MAR. 7, 1906.
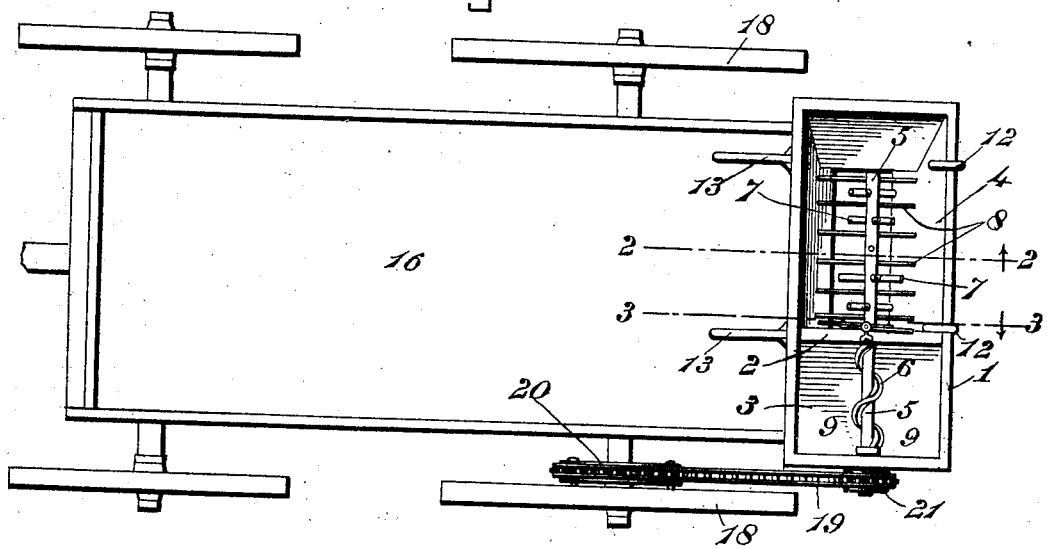
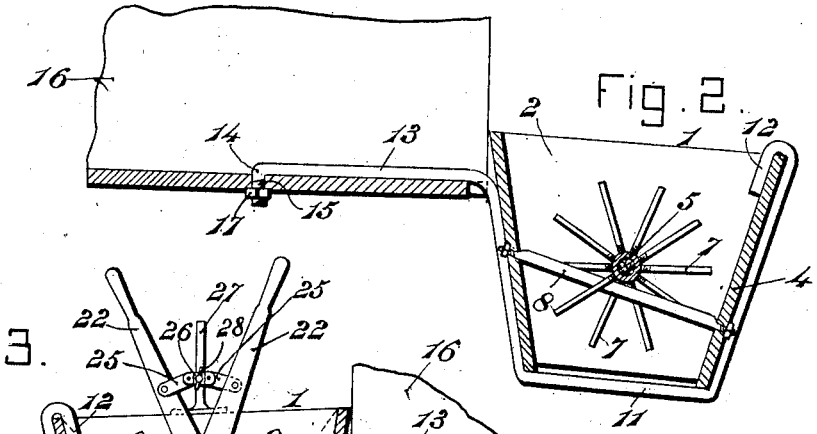
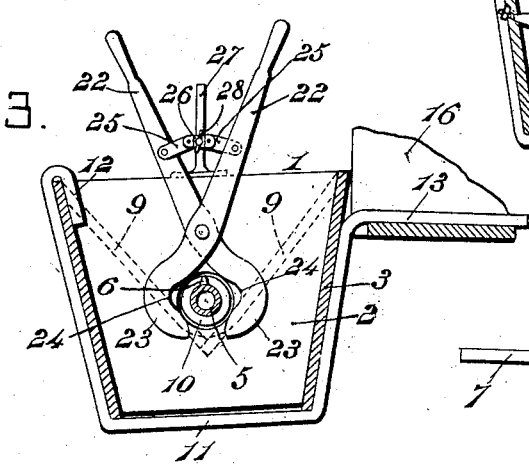
WITNESSES:
Advil McLean Walter
INVENTOR
ATTORNEYS

UNITED STATES PATENT OFFICE.

ADVIL McLEAN WALTER, OF SUMMERTON, SOUTH CAROLINA.

MANURE AND FERTILIZER DISTRIBUTER.

No. 833,268.  Specification of Letters Patent.  Patented Oct. 16, 1906.

Application filed March 7, 1906. Serial No. 304,746.

*To all whom it may concern:*

Be it known that I, ADVIL MCLEAN WALTER, a citizen of the United States, residing at Summerton, in the county of Clarendon and State of South Carolina, have invented a new and useful Manure and Fertilizer Distributer, of which the following is a specification.

This invention relates to manure and fertilizer distributers; and it has for its object to provide a machine of this class which shall be simple in construction and efficient in operation and which may be utilized for distributing compost, such as barn-yard manure, or fertilizing material in powder form, such as guano or bone-meal, either separately or simultaneously.

Further objects of the invention are to provide improved means for regulating the feed of the fertilizing material and for mounting the distributing-hopper in position for operation upon an ordinary wagon box or body.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a top plan view showing the improved manure and fertilizer distributer mounted in operative position upon the box or body of an ordinary farm-wagon. Fig. 2 is a sectional detail view, enlarged, taken transversely through the hopper of the device on the plane indicated by the line 2 2 in Fig. 1. Fig. 3 is a transverse sectional view taken on the plane indicated by the line 3 3 in Fig. 1. Fig. 4 is a sectional detail view of the operating-shaft, showing two of the detachable fingers abutting upon each other.

Corresponding parts in the several figures are indicated throughout by similar characters of reference.

A hopper or receptacle 1 of suitable dimensions is provided with a partition 2, whereby it is divided into compartments 3 and 4, the latter of which is larger than the former. The end walls of the hopper are provided with bearings for a shaft 5, the portion of which lying within the compartment 3 is provided with a spiral flange or worm 6. The portion of the shaft 5 that lies within the compartment 4 of the hopper is provided with radial arms 7, that operate between grate-bars 8 8, that constitute the bottom of the compartment 4. The compartment 3 has a V-shaped bottom composed of downwardly-converging plates 9 9, so that the contents of said compartment may be fed by the spiral flange or screw conveyer through an aperture 10 in the partition-wall 2.

The hopper or receptacle 1 is supported by means of a pair of brackets 11, having downturned hooks 12, that engage the upper edge of the rear wall of the hopper. Said brackets are also provided with forwardly-extending arms 13, having terminal hooks 14 extending through apertures 15 in the bottom of a wagon box or body 16, upon which the device is mounted for operation, said downturned hooks being threaded for the reception of nuts 17, whereby the device is secured in position detachably.

Motion is transmitted to the operating-shaft 5 from one of the wheels 18 of the running-gear by means of a link belt 19, connecting a sprocket-wheel 20 upon the carrying-wheel with a sprocket-wheel 21 upon the shaft 5.

Pivotally mounted upon the partition-wall 2 are a pair of levers 22, having enlarged ends or heads 23, provided with recesses 24, adapted to engage the shaft 5 in such a manner as to obstruct or partially obstruct the aperture 10 when it shall be desired to do so, it being obvious that said aperture may when desired be left unobstructed. These levers obviously serve to regulate the size of the feed-opening through which material is permitted to pass from the compartment 3, thus regulating the feed. The levers 22 are connected, by means of links or toggles 25, with a sleeve 26, sliding upon an upright 27, that is mounted upon the wall or partition 2, said sleeve being provided with a set-screw 28, whereby it may be retained at various adjustments, thus enabling the regulating-levers to be secured in any position to which they may be adjusted.

The radial fingers 7 are connected detachably with the shaft 5 in any convenient manner—for instance, by threading them into the shaft. This is important in order to enable one or more of the fingers to be detached at will for the purpose of regulating the quantity of material to be discharged from the compartment 4 of the hopper.

In the operation of this device the hopper or receptacle 1 may be conveniently mounted upon the box or body of a farm-wagon of ordinary construction, the tail-gate of such wagon having been removed. The manure or compost to be distributed is loaded upon the wagon, together with a supply of fertilizing material in powder form. In order to distribute the material, the fertilizing material is placed in the compartment 3 and the manure or compost is fed into the compartment 4 by the operator, who rides in the wagon. Motion is transmitted from the carrying-wheel 18 to the shaft 5, which is thus continuously rotated while the wagon is in motion, the fingers 7 7 serving to expel the manure between the grate-bars 8 8. The manure or compost will thus be thoroughly broken up and disseminated, while it is obvious that a quantity of said material expelled from the compartment 4 may be regulated by the number of fingers or arms 7. The quantity of fertilizing material permitted to pass from the compartment 3 will be regulated in the manner described by means of the levers 22.

From the foregoing description, taken in connection with the drawings hereto annexed the operation and advantages of this invention will be readily understood. The construction is simple and inexpensive, and by means of this improved device it will be seen that manure and commercial fertilizing material may be distributed simultaneously or separately and that the quantity distributed over a given area may be very accurately gaged.

Having thus described the invention, what is claimed is—

1. In a device of the class described, a hopper or receptacle having a partition provided with an aperture, a shaft journaled in the end walls of the receptacle and extending through the partition, grate-bars forming the bottom of one of the compartments, radial fingers connected with the shaft and operating between the grate-bars, a V-shaped bottom in the other compartment, a spiral conveyer-flange upon the shaft in the latter compartment, means for supporting the receptacle in operative position upon a wagon-box, and means for transmitting motion to the shaft from one of the carrying-wheels of the running-gear.

2. In a device of the class described, a receptacle having two compartments, spaced bars forming the bottom of one of the compartments, a V-shaped bottom in the other compartment, a shaft journaled in the end walls of the receptacle and extending through an aperture in the partition between the compartments, fingers connected detachably with the shaft and operating between the spaced bars of the one compartment, a spiral conveyer upon the portion of the shaft within the other compartment, a pair of levers having enlarged heads provided with shaft-engaging recesses said levers being fulcrumed upon the apertured partition, and means for adjusting said levers and for securing them at various adjustments.

3. In a device of the class described, a receptacle having a manure-compartment and a fertilizer-compartment, spaced grate-bars forming the bottom of the manure-compartment, a shaft journaled in the end walls of the receptacle extending through an aperture in the partition between the compartments and having means for expelling the contents of said compartments, supporting-brackets having downturned hooks engaging the rear wall of the receptacle, and arms extending forwardly from said brackets and having downturned hooks and nuts threaded thereon.

In testimony that I claim the foregoing as my own I have hereto affixed my signature in the presence of two witnesses.

ADVIL McLEAN WALTER.

Witnesses:
JACK C. DAY,
E. E. PLATT.